United States Patent
Zohner et al.

(10) Patent No.: US 9,071,460 B1
(45) Date of Patent: Jun. 30, 2015

(54) METHODS AND APPARATUS FOR MAPPING DATA PACKETS TO A MULTI-PACKETS CELL

(75) Inventors: Thayl Zohner, Naperville, IL (US); David George Rancich, Naperville, IL (US); Adam Goldstein, Fayetteville, NY (US)

(73) Assignee: Tellabs Operations, Inc., Naperville, IL (US)

( * ) Notice: Subject to any disclaimer, the term of this patent is extended or adjusted under 35 U.S.C. 154(b) by 110 days.

(21) Appl. No.: 13/439,101

(22) Filed: Apr. 4, 2012

(51) Int. Cl.
*H04L 12/54* (2013.01)
*H04L 12/947* (2013.01)
*H04L 12/935* (2013.01)

(52) U.S. Cl.
CPC ............. *H04L 12/5601* (2013.01); *H04L 49/25* (2013.01); *H04L 49/30* (2013.01)

(58) Field of Classification Search
None
See application file for complete search history.

(56) References Cited

U.S. PATENT DOCUMENTS

| | | | |
|---|---|---|---|
| 5,481,544 A * | 1/1996 | Baldwin et al. ............... | 370/392 |
| 7,089,320 B1 * | 8/2006 | Biederman et al. ........... | 709/234 |
| 8,107,477 B2 * | 1/2012 | Atoji ............................. | 370/394 |
| 2002/0101871 A1 * | 8/2002 | Takase et al. .................. | 370/390 |
| 2002/0126677 A1 * | 9/2002 | Hathaway et al. ........ | 370/395.64 |
| 2002/0163922 A1 * | 11/2002 | Dooley et al. .................. | 370/412 |
| 2003/0026262 A1 * | 2/2003 | Jarl ............................... | 370/394 |
| 2003/0041216 A1 * | 2/2003 | Rosenbluth et al. .......... | 711/141 |
| 2003/0048781 A1 * | 3/2003 | Pierson ......................... | 370/389 |
| 2004/0037277 A1 * | 2/2004 | Mathews et al. .............. | 370/386 |
| 2006/0274656 A1 * | 12/2006 | Paul et al. ...................... | 370/231 |
| 2007/0177601 A1 * | 8/2007 | Tsushita et al. ............ | 370/395.1 |
| 2007/0214401 A1 * | 9/2007 | Chow et al. ................... | 714/776 |

* cited by examiner

*Primary Examiner* — Otis L Thompson, Jr.
(74) *Attorney, Agent, or Firm* — James M. Wu; JW Law Group (57) ABSTRACT

A network method and apparatus configured to increase bandwidth efficiency using multiple packets cells ("MPC") is disclosed. MPC, in one embodiment, includes a header, a payload, a first cell packet indicator ("CPI") and a second CPI. The first CPI includes a first start of packet ("SOP") field, a first end of packet ("EOP") field, and a first length field. The first SOP field is used to indicate that the payload contains the first portion of a first packet and the first EOP field indicates that the payload contains the last portion of the first packet. The first length field indicates total number of bytes associated with the first packet that are stored in the payload. Similarly, the second CPI includes a second SOP field, a second EOP field, and a second length field, and it is used to track the second packet.

20 Claims, 8 Drawing Sheets

FIG. 8 ed in this specification, specify the presence of stated features, integers, steps, operations, elements, and/or components, but do not preclude the presence or addition of one or more other features, integers, steps, operations, elements, components, and/or groups thereof.

METHODS AND APPARATUS FOR MAPPING DATA PACKETS TO A MULTI-PACKETS CELL

FIELD

The exemplary embodiment(s) of the present invention relates to communications networks. More specifically, the exemplary embodiment(s) of the present invention relates to data transmission.

BACKGROUND

With rapid growth of mobile data transfer over a high-speed communication network such as 3G or 4G cellular services, managing and controlling such data transfer become increasingly difficult and complicated. A conventional network layout includes Internet, LAN (local area network), and wireless networks that include hundreds of network devices such as access switches, routers, and bridges for facilitating data delivery from source devices to destination devices. Transferring massive amount of data efficiently between service provider(s) and end users over a typical and/or standard network becomes increasingly challenging.

To simplify scheduling traffic through a shared switching resource packets are typically converted to cells. A typical problem associated with using cell(s) for packet transfer is the tradeoff between a predefined cell size and overhead. If, for example, the cell is small, the overhead can consume a significant amount of the bandwidth. If, however, the cell is large, potential waste in mapping small packets can occur. For instance, if a cell can carry 64 bytes of payload and the packet is 65 bytes long, while one cell is fully packed with the first 64 bytes of the packet, the next cell is only packed with one (1) byte. Such a scenario results in typical bandwidth efficiency of barely over 50%.

A conventional solution is to increase bandwidth capacity such as faster clock cycle to compensate for bandwidth inefficiency. A drawback associated with this approach is that it increases design complication as well as additional costs and resources.

SUMMARY

A network method and apparatus are configured to increase bandwidth efficiency using multiple packet cells ("MPCs"). MPC, in one embodiment, includes a header, a payload, a first cell packet indicator ("CPI") and a second CPI. The first CPI includes a first start of packet ("SOP") field, a first end of packet ("EOP") field, and a first length field. The first SOP field is used to indicate that the payload contains the first byte of a first packet and the first EOP field indicates that the payload contains the last byte of the first packet. The first length field indicates total number of bytes associated with the first packet that are stored in the payload. Similarly, the second CPI includes a second SOP field, a second EOP field, and a second length field. The second SOP field indicates that the payload contains the first byte of the second packet and the second EOP field indicates that the payload contains the last byte of the second packet. The second length field indicates total number of bytes associated with the second packet that are stored in the payload.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Exemplary embodiment(s) of the present invention is described herein in the context of a method, device, and apparatus of employing a multi-packets cell ("MPC") able to improve bandwidth efficiency by mapping multiple packets into each MPC.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "system" is used generically herein to describe any number of components, elements, sub-systems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

One embodiment of the present invention discloses a line module using multi-packets cells ("MPC") to increase its efficiency of bandwidth for data transmission rate in a switch or router. MPC, in one embodiment, includes a header, a payload, a first cell packet indicator ("CPI") and a second CPI. The first CPI includes a first start of packet ("SOP") field, a first end of packet ("EOP") field, and a first length field. The first SOP field is used to indicate that the payload contains the first byte of a first packet and the first EOP field indicates that the payload contains the last byte of the first packet. The first length field indicates total number of bytes associated with the first packet that are stored in the payload. Similarly, the second CPI includes a second SOP field, a second EOP field, and a second length field. The second SOP field indicates that the payload contains the first byte of the second packet and the second EOP field indicates that the payload contains the last byte of the second packet. The second length field indicates total number of bytes associated with the second packet that are stored in the payload.

Figure 1:
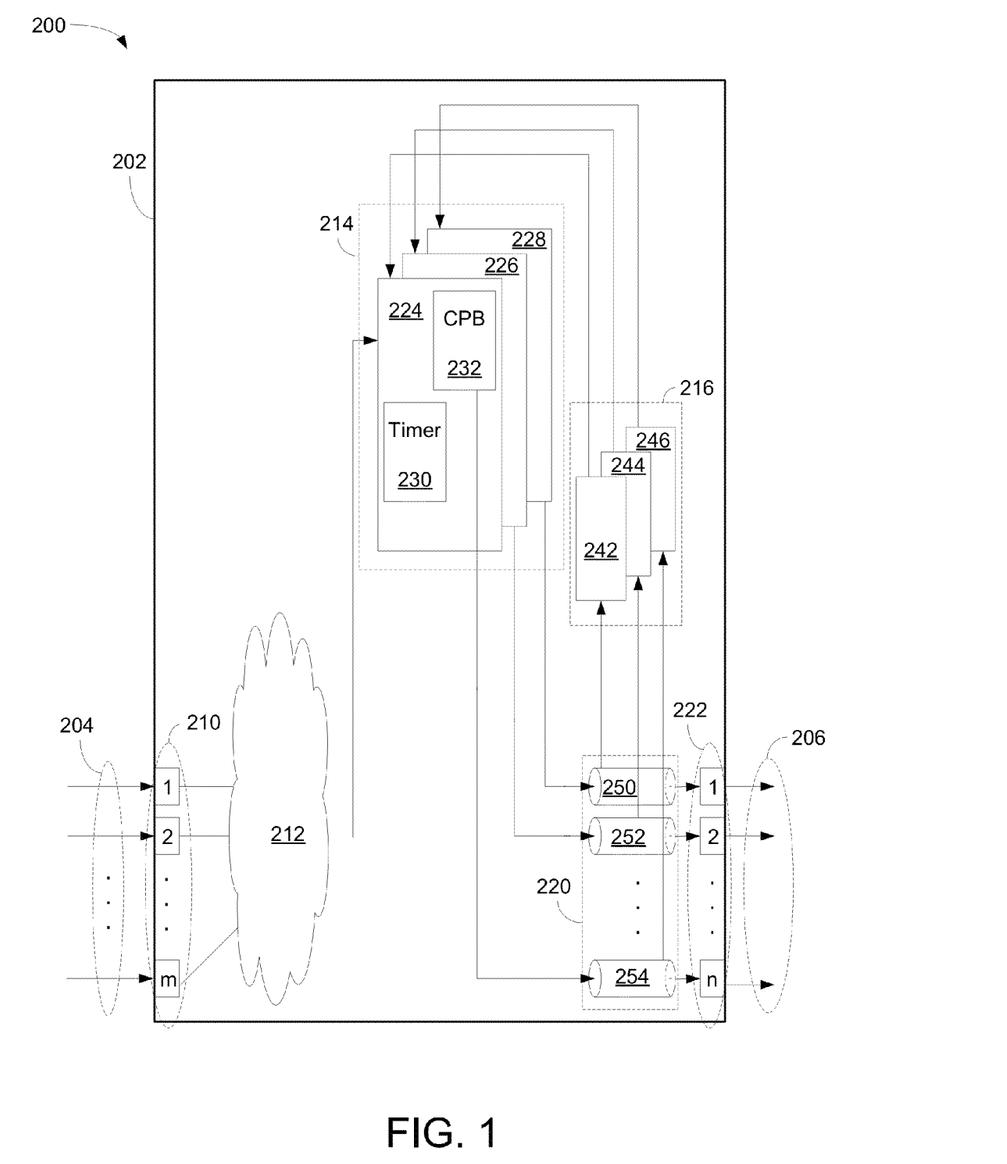
FIG. 1 is a block diagram illustrating an exemplary line module configured to map packets into cells to improve bandwidth efficiency in accordance with one embodiment of the present invention.

FIG. 1 is a block diagram 200 illustrating an exemplary line module configured to map packets into a cell to improve bandwidth efficiency in accordance with one embodiment of the present invention. Diagram 200 includes a line module 202, a set of input data streams 204, and a set of output data streams 206. Line module 202 can also be referred to as line module interface, device, and/or line card capable of transmitting data streams using cells or MPCs. Line module 202, in one example, may be a part of a router, modem, hub, bridge, server, switch, line card, and/or node. It should be noted that the underlying concept of the exemplary embodiment(s) of the present invention would not change if one or more blocks (or devices) were added to or removed from diagram 200.

Line module 202, in one embodiment, includes a group of input ports 210, group of output ports 222, mapping block 214, virtual output queues 220, queuing status block 216. A function of mapping block 214 of line module 202 is capable of putting multiple packets or partial packets into a cell until the cell is filled. Queuing status block 216 is configured to monitor and track queuing status for every virtual output queue ("VOQ"). For example, queuing status block 216 is able to monitor how full and/or how empty each VOQ currently is. The queuing status, in one example, is subsequently forwarded to Timer 230 to adjust the time allowed for a cell to be fully packed.

Mapping block 214 includes multiple mapping components 224-228 wherein each mapping component includes a cell packing block ("CPB") 232, and a timer 230. Each mapping component, in one example, is designated to pack MPC(s) for a particular predefined VOQ. Timer 230 controls the maximum time allowed to fully pack MPC with incoming packets.

CPB 232, in one embodiment, includes a memory hardware component capable of storing content of two or more entire MPC. The MPC, in one aspect, can also be referred to as a cell packing cell ("CPC"). For example, if an MPC includes 144 bytes of payload and 64 bytes of overhead, the memory hardware component or memory is at least 208 bytes. When two (2) MPCs are employed, the memory is 416 (2×208) bytes. It should be noted that data unit can be any suitable number of bits which, for example, could be byte, word, double words, quad words, and the like depending on the applications. To simplify forgoing discussion, byte (8 bits) is used as an exemplary data unit. CPB 232 further includes controlling and tracking components that are able to track number of bytes used for storing each packet as well as free space available to store additional packets in the memory or MPC. In one embodiment, CPB 232 maintains packets stored in MPC by setting and resetting various fields in MPC. For example, values of SOP and EOP are managed by CPB 232. In one embodiment, CPB 232 uses two (2) packed cells or MPCs to cover cases wherein the arriving packet fills more than one (1) cell.

Timer 230 is used to provide a predefined maximum latency or time period to pack MPC in accordance with incoming packet stream. The status and/or congestion of the VOQ may be identified in response to queuing status provided by the VOQs via queuing status block 216. It should be noted that the timer, in one embodiment, is extended and the packet is not forwarded to the VOQ until it is full when the VOQ is congested.

One exemplary embodiment of the present invention illustrates a technique of putting multiple small packets in an MPC. For example, a packet may be packed into a cell or MPC and the remaining free space in the payload may be used to pack the beginning portion of the next incoming packet. MPC or cell may, for example, have a mixture of a packet end, a full small packet, packet middle, and/or a packet start. Timer 230 is able to provide a programmable timer to advance a cell or MPC that has not been filled before its latency causes a problem. The expiration of timer, in one example, may be extended and the CPB packet isn't forwarded until it is filled when the queue is congested since the incurring of additional packing latency will not affect the overall latency.

To optimize bandwidth efficiency, VOQs 250-254 periodically report their queuing status to queuing status block 216. Queuing status block 216 includes status monitors 242-246. Status monitors 242-246, in one example, are coupled to VOQs 250-254, respectively.

In one embodiment, line module 202 having a cell or MPC capable of packing up to four packets includes a first, second, third, and fourth CPIs. Each CPI includes a SOP field, EOP field, and length field. While SOP field indicates MPC containing the first byte of a packet, the EOP field indicates MPC containing the last byte of a packet. The length field indicates the total number of bytes associated with a packet in MPC. In addition to CPIs, MPC also includes a header and a payload. The header which includes the CPI also contains other information such as routing path(s). The payload which is also adjacent to the CPI is capable of containing at least one packet.

The CPB is designated to pack incoming packets to one or more cells or MPCs while the timer which is coupled to the CPB limits packet packing duration to a predefined time period before MPC(s) is forwarded to a queue. In one embodiment, line module 202 further includes queuing status block, also known as a threshold checker, is capable of changing the packet packing duration in response to switch congestions. Each of VOQs 250-254 is able to queue multiple MPCs in a sequence. In one example of the MPC, the SOP field is a one (1) bit field and the EOP field is also a one (1) bit field. It should be noted that the length field can be configured in such a way that it indicates the length of a packet or a portion of the packet stored in the cell.

It should be noted that the length field may be dependent on the maximum number of units, wherein a unit can be byte, words, or double words, or any other number of bits that is convenient to the application.

An advantage of employing MPC is to increase network performance by maximizing usage of payload capacity of a cell with minimal increase in overhead.

Figure 2:
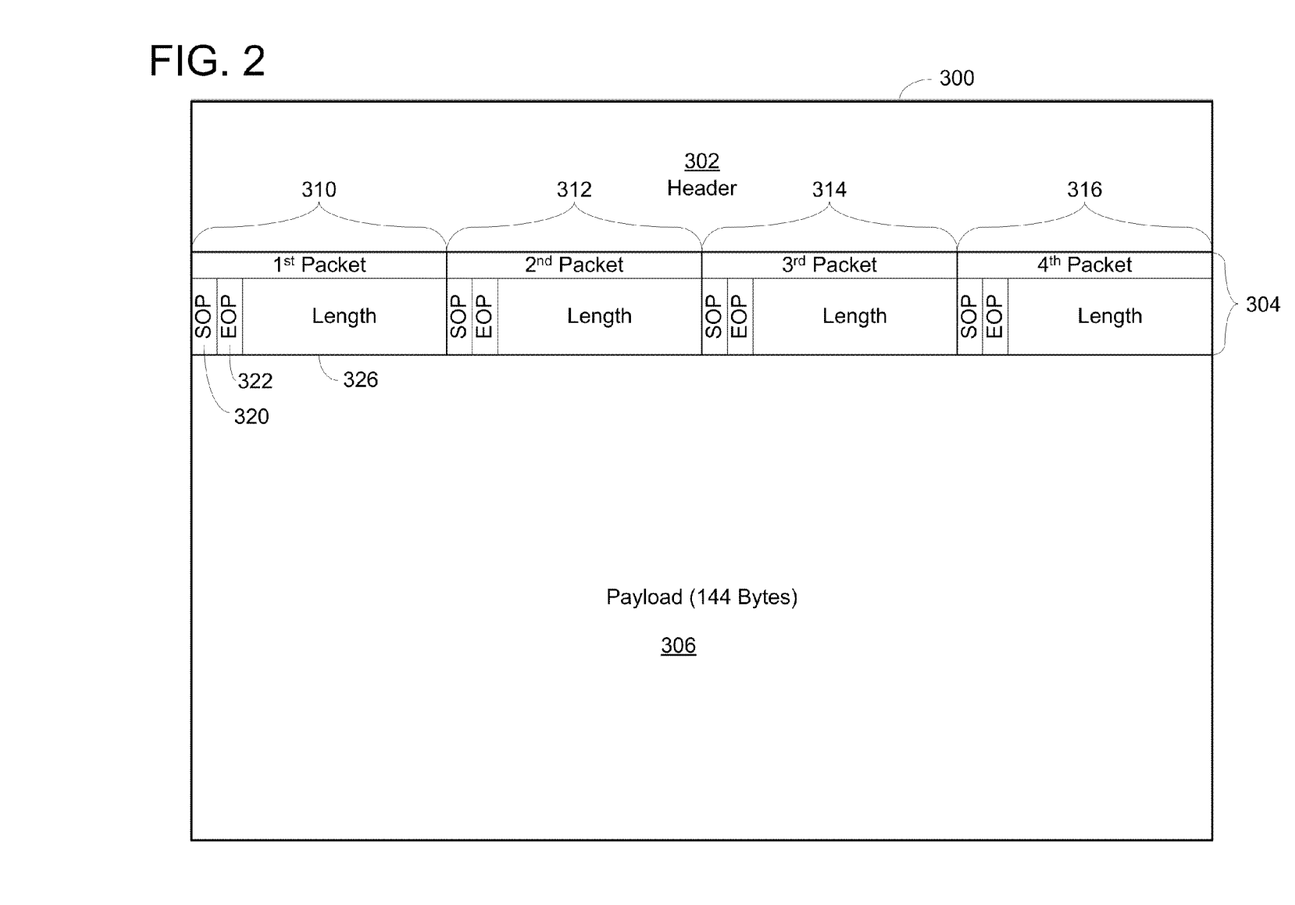
FIG. 2 is a block diagram illustrating a multi-packets cell capable of packing more than one packet in the cell in accordance with one embodiment of the present invention.

FIG. 2 is a block diagram illustrating an MPC 300 capable of packing more than one packet in the cell in accordance with one embodiment of the present invention. MPC 300 includes header 302, packing track block 304, and payload 306. Packing track block 304, in one embodiment, includes four (4) CPIs 310-316 which indicate that MPC 300 can pack up to four (4) packets. Each CPI such as CPI 310 includes a SOP field 320, EOP field 322, and length field 326. It should be noted that the size or capacity of MPC 300 can change depending on applications. For example, payload 306 can increase to 2000 bytes wherein packing track block 304 may contains 50 CPIs. It should be noted that the underlying concept of the exemplary embodiment(s) of the present invention would not change if one or more blocks (or fields) were added to or removed from MPC 300.

One embodiment of present invention is used in a VOQ switch with a cell payload size of 144 bytes and a maximum number of four (4) packets per cell. Note that depending on applications, the VOQ switch can be provisioned or configured to adjust cell sizes as well as maximum packets per cell or MPC. To support four possible packets in a cell or MPC, header 302 is extended 10 bits for each possible packet which results in additional 40 bits or 5 bytes in header 302 since packing track block 304 is considered as part of header or overhead. The ten (10) bits per packet include one (1) bit for SOP, one (1) bit for EOP and eight (8) bits for length. In a VOQ switch or system, a VOQ may be used for every priority of every destination. For example if there are 10 destinations and four priorities, there will be 40 VOQs. All packets with common particular destination and priority will be stored in the same VOQ.

An advantage of employing MPC is to increase bandwidth efficiency by using relatively large MPC that allows multiple packets to be packed into a cell.

Figure 3:
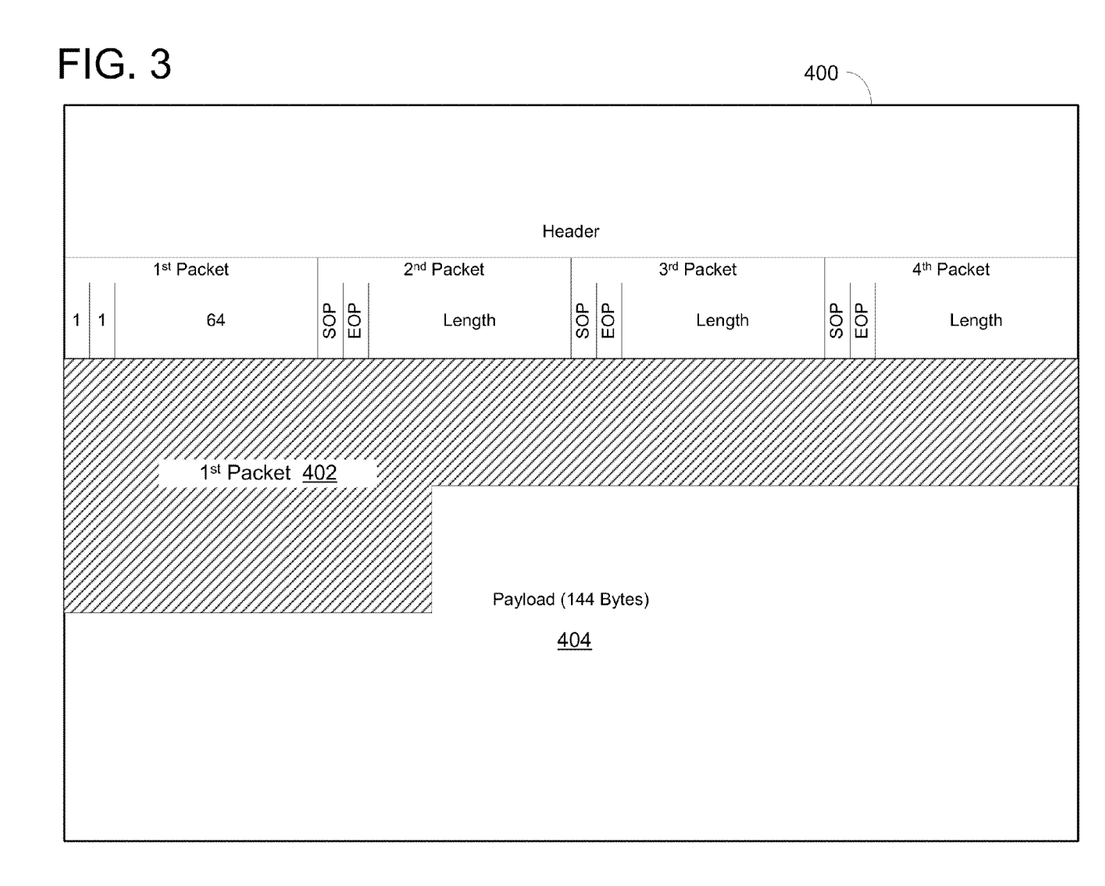
FIGS. 3-7 illustrate exemplary mapping processes capable of packing packets into multi-packets cell(s) in accordance with one embodiment of the present invention.

FIG. 3 illustrates an exemplary mapping process capable of packing packets into an MPC 400 in accordance with one embodiment of the present invention. The cell packing block or CPB contains a memory which is able to store two cells cell. When a packet 402 is received, packet 402 is mapped to cell packing cell 400. If cell packing cell 400 is initially empty, the SOP bit is set in the $1^{st}$ packet field of the header, and the length field is set to 64 if the total number of bytes for packet 402 is 64 bytes. Since the last byte of packet 402 is also in cell packing cell 400, the EOP bit is also set to "1" in the $1^{st}$ packet field. The remaining available space 404 in the payload is 80 bytes (144−64=80).

Figure 4:
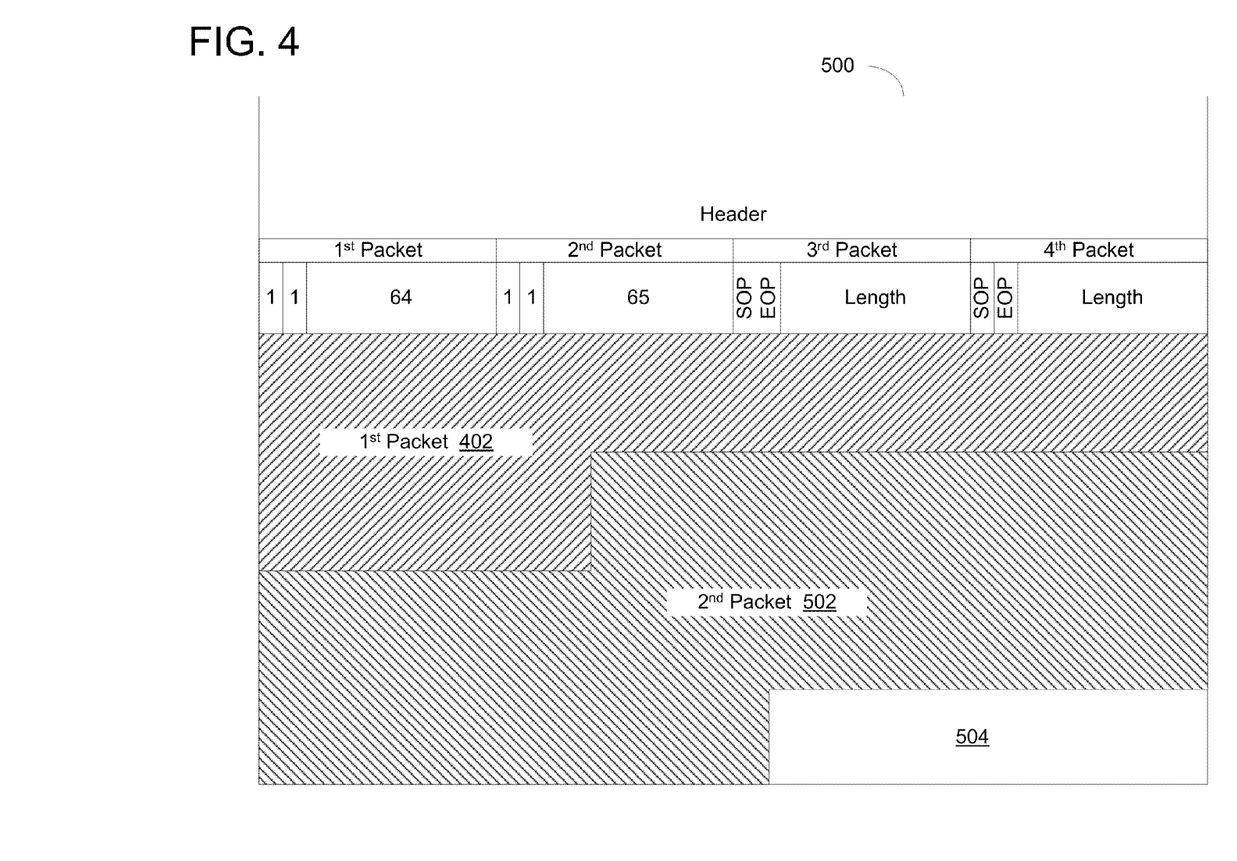

FIG. 4 illustrates an exemplary mapping process following the process shown in FIG. 3, wherein the process is able to pack additional data in an MPC 500 in accordance with one embodiment of the present invention. A second packet 502 arrives at MPC 500 wherein packet 502 is destined for the same VOQ as indicated in FIG. 4. Packet 502, for instance, is a 65-byte packet. Since the available space in MPC 500 is 80 bytes after storage of packet 402 as discussed in FIG. 4, second packet 502 can fit entirely in the free space of MPC 500. After second packet 502 is packed adjacent to first packet 402, length field in $2^{nd}$ packet is set to 65 which indicates the number of bytes associated with second packet 502 stored in MPC 500. Since both the first byte and the last byte of second packet are stored in MPC 500, the SOP and EOP fields in the $2^{nd}$ packet field of the header are set. The remaining available space 504 in the payload is 15 bytes (144−64−65=15).

Figure 5:
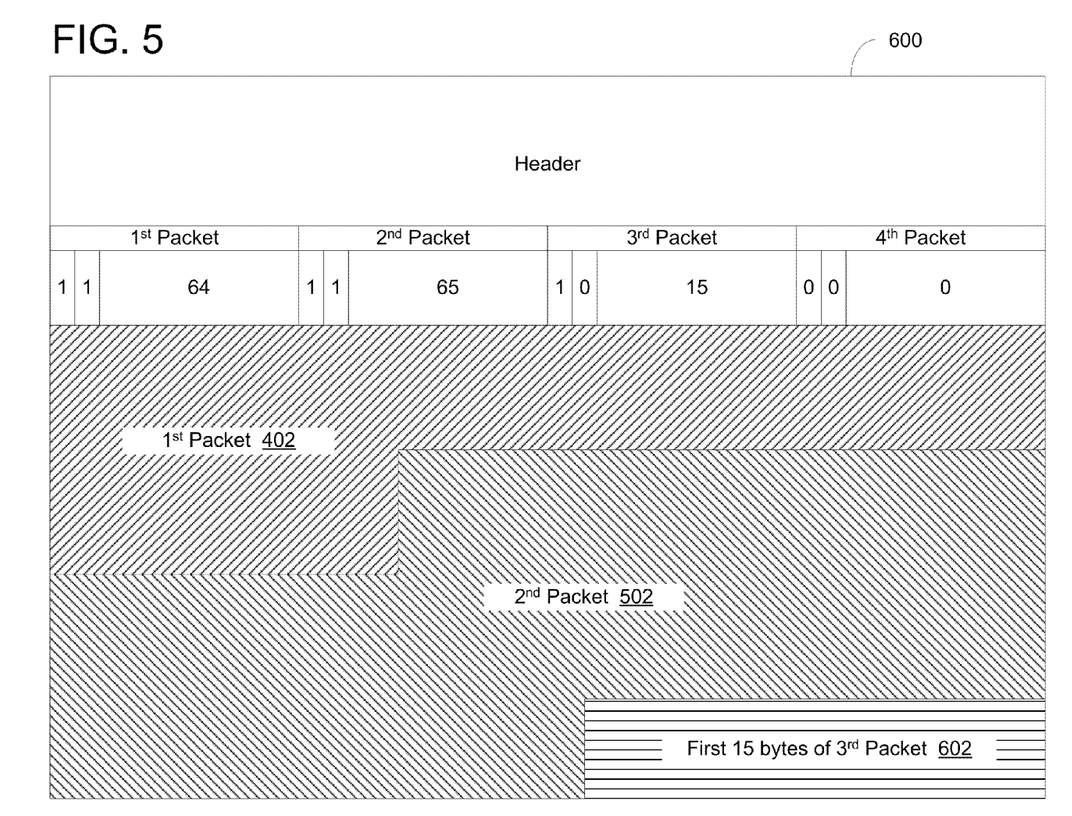

FIG. 5 illustrates an exemplary mapping process following the process shown in FIG. 4 capable of packing additional data in MPC 600 in accordance with one embodiment of the present invention. A third packet having 200 bytes arrives at MPC for the same VOQ. The first 15 bytes of third packet 602 are put into the cell. Since MPC 600 stores the first 15 bytes of third packet 602, the length field of $3^{rd}$ packet is set to 15. The SOP filed is set because MPC 600 contains the first byte of third packet. The EOP field of $3^{rd}$ packet field is cleared because MPC 600 does not have the last byte of third packet. Note that the fourth ($4^{th}$) packet field of the header is cleared or reset to zero because there is no more room for additional packet(s)

Once the payload of MPC 600 is filled, MPC 600 is sent or copied to an appropriate VOQ for transmission. The memory of cell packet cell is subsequently cleared so that the memory can be used again to process or pack subsequent incoming packet(s) and/or remaining (or partially) not-yet-packed packet(s).

Figure 6:
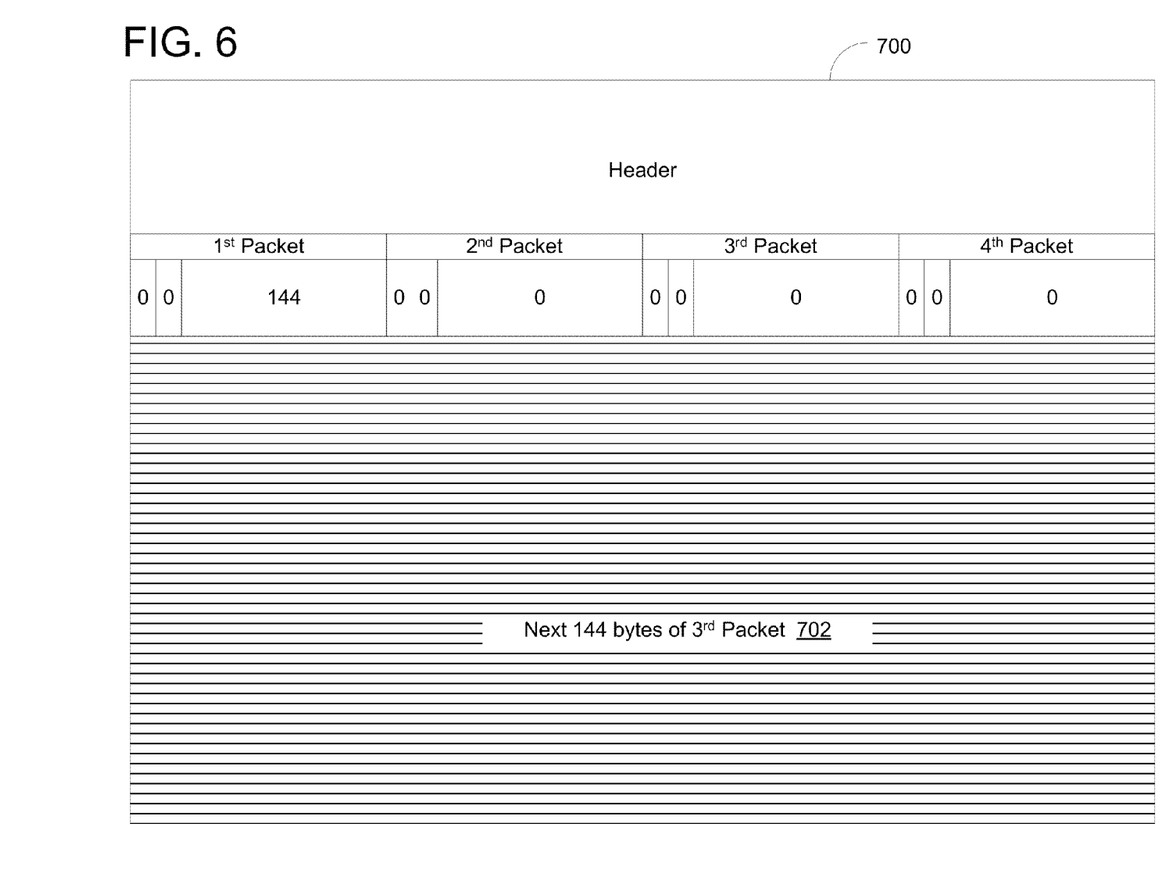

FIG. 6 illustrates an exemplary mapping process following the process shown in FIG. 5, wherein the process is capable of packing packets into an MPC 700 in accordance with one embodiment of the present invention. After packing the first 15 bytes of the third packet to the previous MPC as shown in FIG. 5, the third packet still has 185 bytes remaining. After forwarding the previous cell (MPS 600), the next 144 bytes of third packet 702 is now put into cell packer cell for the same VOQ. Both SOP field and EOP of $1^{st}$ packet field are cleared since neither the first byte nor the last byte is in the payload. The length field of $1^{st}$ packet filed is set to 144 indicating number of bytes associated with the third packet in the payload.

After MPC 700 is filled with 144 bytes of third packet 702, it is copied or queued at the associated VOQ waiting to be transmitted. Once the cell or MPC 700 is sent and/or queued, the cell packet cell or MPC for this VOQ is then cleared. There are 41 bytes (200−(15+144)=41) left unsent or unpacked for the third packet.

Figure 7:
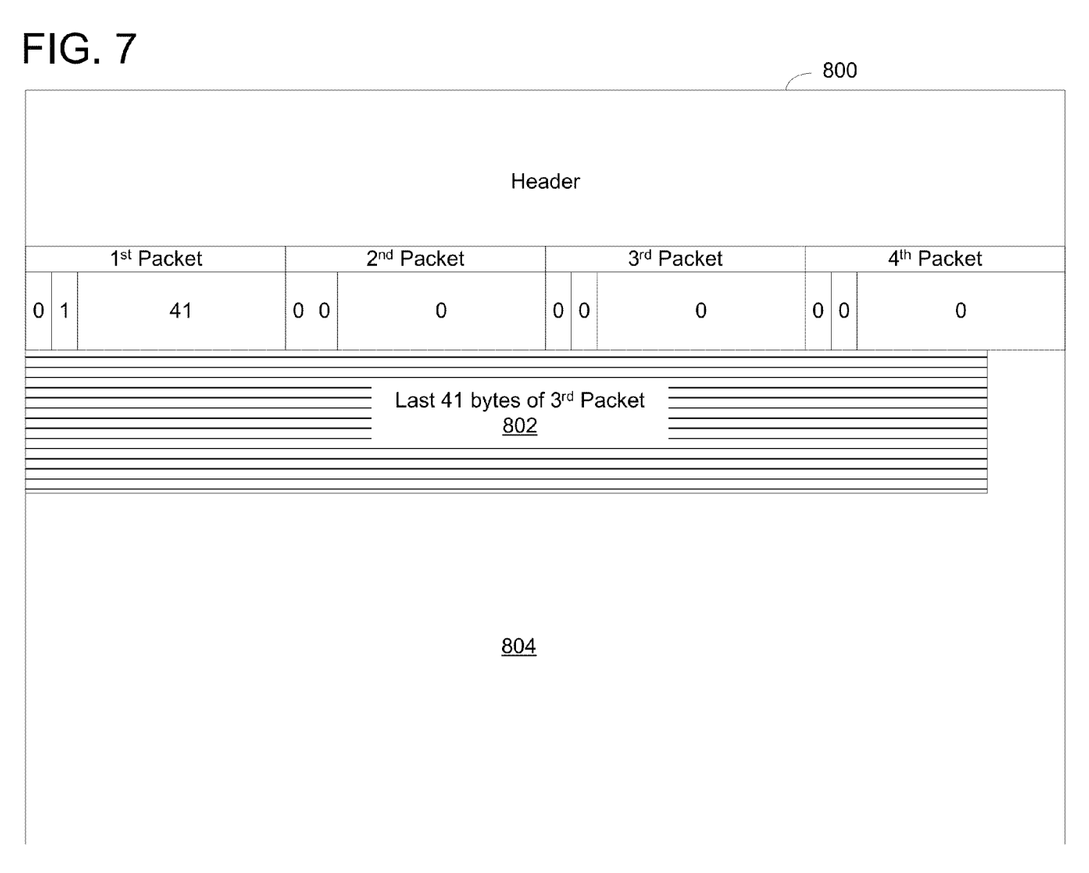

FIG. 7 illustrates an exemplary mapping process following the process shown in FIG. 6, wherein the process is able to pack additional data to MPC 800 in accordance with one embodiment of the present invention. After packing the 144 bytes of the third packet to the previous MPC as shown in FIG. 6, the third packet still has 41 bytes remaining. Once the first cell packet cell is full, the remaining 41 bytes of third packet 802 are put into the second cell packer cell for the same VOQ. The SOP field of the $1^{st}$ packet field is cleared because MPC 800 does not contain the first byte of the third packet, and the EOP field is set since MPC 800 contains the last (end) byte of the third packet. It should be noted that the remaining free space 804 in the payload of MPC 800 can be used to pack additional incoming packet(s).

When a cell or MPC is partially filled and another packet for the same VOQ fails to arrive within a reasonable time frame or a predefined latency, the partially filled cell will be forwarded to the VOQ for transmission when the maximum cell packing latency timer expires. To enhance bandwidth efficiency, the timer can be different for each cell packer cell based on the maximum allowable latency for packets of a particular VOQ. If the timer expires and the VOQ is below a settable threshold, the cell packer cell associated with that timer is forwarded to its associated VOQ. In one embodiment, the threshold check allows a longer packing time when the VOQs experience network congestion. In this case, longer packing time doesn't necessarily means longer latency since the VOQ is already backed up. So, the threshold check can allow more packing time (improved throughput) without latency penalty.

Figure 8:
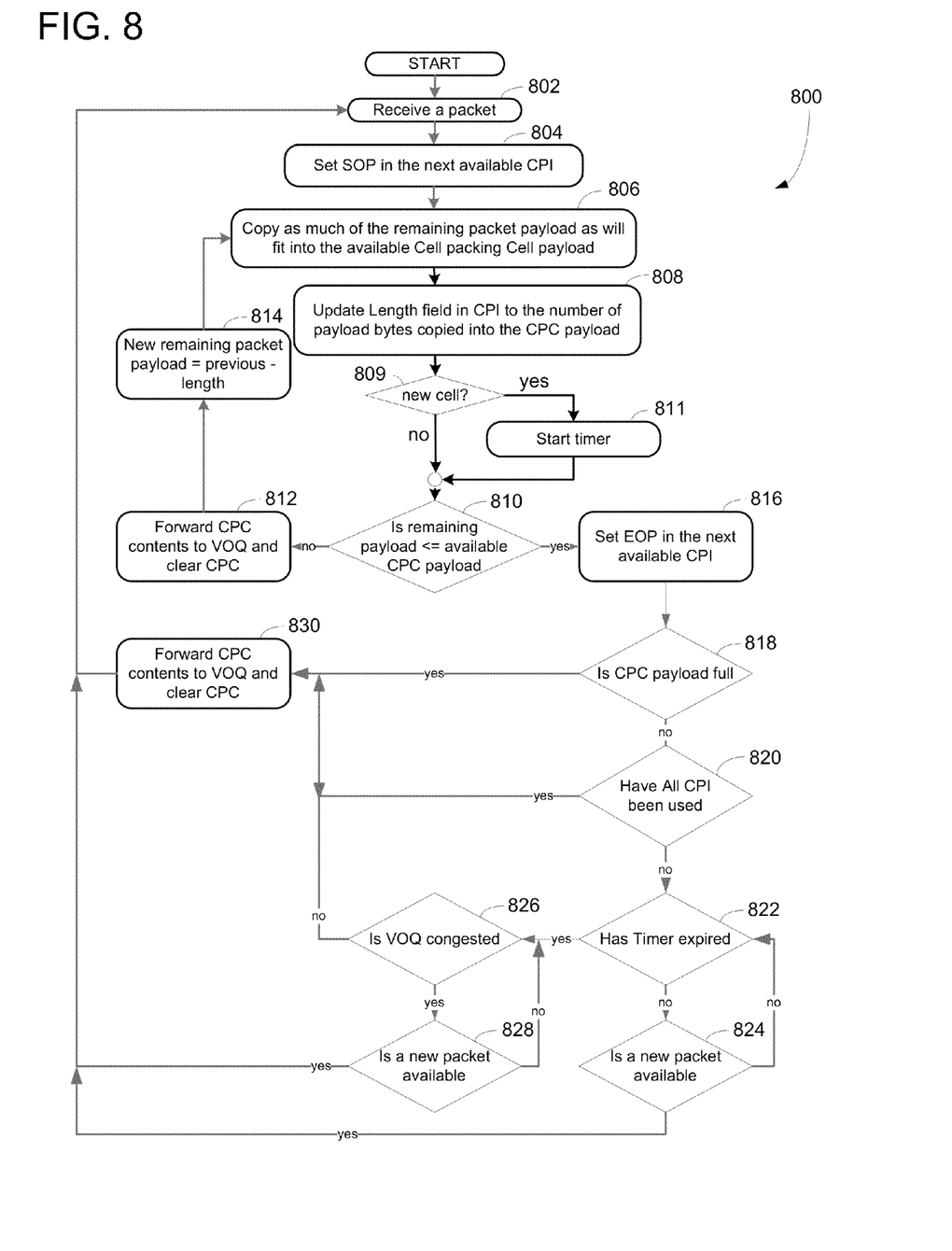
FIG. 8 is a flowchart illustrating an exemplary process of mapping packets into a multi-packets cell in accordance with one embodiment of the present invention.

FIG. 8 is a flowchart 800 illustrating an exemplary process of packing packets into an MPC in accordance with one embodiment of the present invention. Upon receipt of a packet at block 802, the process sets SOP in the next available CPI at block 804. After identifying the beginning of available space at CPB, the packet payload at block 806 is packed or mapped into the available MPC payload until either the available space in CPC is exhausted or the last bit of packet payload has been fitted into the cell. At block 808, the length field of CPI is updated to reflect the number of payload units such as bytes that have been copied into the CPC payload.

The process proceeds to block 811 to start the timer if the cell is a new cell determined at block 809. If the cell is not a new cell, the process proceeds from block 809 to block 810. The process, at block 810, determines whether the remaining packet payload is smaller or equal to the available CPC payload. If the remaining packet payload is greater than the available CPC payload, the process proceeds to block 812 and otherwise, the process proceeds to block 816. At block 812, the process forwards CPC content to VOQ and subsequently clears CPC (or MPC). The process, at block 814, determines the new remaining packet payload by subtracting the length from the previous length, and subsequently proceeds to block 806.

At block 816, since the remaining packet payload is equal or smaller thank available CPC payload, EOP in the next available CPI is set. The process, at block 818, proceeds to block 830 if the CPC payload is full. Otherwise, the process proceeds to block 820. The process, at block 820, proceeds to block 830 if all of the CPI have been used. Otherwise, the process proceeds to block 822. At block 830, the process forwards CPC contents to VOQ and MPC (or CPC) is subsequently cleared. The process proceeds from block 830 to block 802 waiting to receive new packet(s).

At block 822, the process proceeds to block 826 if the timer has expired. Otherwise, the process proceeds to block 824. At block 824, the process proceeds to block 802 if a new packet is available. Otherwise, the process proceeds to block 822. At block 826, the process proceeds to block 828 if the VOQ is congested. Otherwise, the process proceeds to block 830. At block 828, the process proceeds to block 802 if a new packet is available. Otherwise, the process proceeds to block 826.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A network device comprising:
a mapping block for packet mapping in a cell for a communication network; wherein the cell includes,
a first cell packet indicator ("CPI") configured to have a first start of packet ("SOP") field, a first end of packet ("EOP") field, and a first length field, wherein the first SOP field indicates the cell containing start of first packet, wherein the first EOP field indicates the cell containing end of the first packet, wherein the first length field indicates a portion of the first packet packed in the cell, wherein the portion of the first packet contains less number of bytes than total number bytes of the first packet; and
a second CPI situated adjacent to the first CPI and configured to have a second SOP field, a second EOP field, and a second length field, wherein the second SOP field indicates the cell containing start of second packet, wherein the second EOP field indicates the cell containing end of the second packet, wherein the second length field indicates a portion of the second packet packed in the cell.

2. The device of claim 1, further comprising a payload capable of containing at least a partial packet.

3. The device of claim 2, further comprising a plurality of additional CPIs.

4. The device of claim 3, further comprising a cell packing block ("CPB") able to pack a plurality of packets into the cell.

5. The device of claim 4, further comprising:
a CPB per every virtual output queue ("VOQ") capable of packing a plurality of packets into the cell; and
a timer coupled to the CPB and configured to limit packet packing duration to a predefined time period before a partially packed cell is forwarded to a queue.

6. The device of claim 5, further comprising a threshold checker coupled to the timer and configured to extend the packet packing duration in response to network performance.

7. The device of claim 5, wherein the queue is a virtual output queuing which is capable of queuing a plurality of cells in sequence.

8. The device of claim 1, wherein last updated EOP field and length field indicates next available space for cell packing in the cell.

9. A switch configured to processing and routing multi-packet cells ("MPCs") comprising the device of claim 1.

10. A switching device, comprising:
a cell packing block ("CPB") configured to map a plurality of packets into a cell, the cell having a header, a plurality of cell packet indicators ("CPIs"), and a payload, wherein each of the plurality of CPIs includes a start of packet ("SOP") field, an end of packet ("EOP") field, and a length field, wherein the SOP field indicates beginning of a first packet in the payload of the cell, wherein the EOP field indicates end of the first packet in the payload of the cell, wherein the length field indicates a portion of bytes associated with the first packet in the payload of the cell, wherein the portion of bytes includes less number of bytes than total number bytes of the first packet, wherein the plurality of CPIs includes a first CPI and a second CPI which is situated adjacent to the first CPI; and
a timer coupled to the CPB, and configured to provide a predefined time limit for each CPB to complete packing the cell before it is forwarded to a queue for transmission.

11. The device of claim 10, wherein a first portion of first packet contains first bit of the first packet.

12. A method of packet packing in a communications network, comprising:
receiving a first packet for transmission;
identifying next available space for cell packing in a cell packing block ("CPB") and determining a cell packet indicator ("CPI") which is situated adjacent to at least one another CPI to indicate a location in the CPB in which at least a beginning portion of the first packet is to be packed;

packing at least a portion of the first packet into next available space of the CPB and setting a start of packet ("SOP") field of the CPI to indicate that the beginning portion of the first packet is in the CPB, wherein packing at least a portion of the first packet includes packing less than total number of bytes of the first packet in the CPB;

setting an end of packet ("EOP") field of the CPB to indicate that last portion of the first packet is in the CPB if packet size of the first packet is smaller than the available space in the CPB; and storing a value in a length field of the CPI to indicate a portion of the first packet that is packed in the CPB.

13. The method of claim 12, further comprising:
receiving a second packet for transmission;
identifying second next available space for cell packing in the CPB and determining a second CPI indicating the second next available space within the CPB;
packing at least a beginning portion of the second packet into the second next available space of the CPB and setting a SOP field of the second CPI to indicate that the beginning portion of the second packet is in the CPB;
setting an EOP field of the second CPI to indicate that last portion of the second packet is in the CPB if packet size of the second packet is smaller than the second next available space in the CPB; and
storing a second value in a length field of the second CPI to indicate total length of the second packet in the CPB.

14. The method of claim 13, further comprising:
receiving a third packet for transmission;
identifying third next available space for cell packing in the CPB and determining a third CPI indicating the third next available space in the CPB;
beginning to pack at least a portion of the third packet into the third next available space of the CPB and setting a SOP field of the third CPI to indicate that beginning portion of the third packet is in the CPB; and
storing a third value in a length field of the third CPI to indicate total length of the third packet in the CPB.

15. The method of claim 14, further comprising forwarding content of the CPB to a queue as a cell mapped by the CPB.

16. The method of claim 15, further comprising:
packing remaining portion of the third packet into a payload of a second CPB;
resetting a first SOP field of second CPB to indicate that first portion of third packet is not in the payload;
setting a first EOP field of second CPB to indicate that last portion of the third packet is in the payload; and
storing a new value in a first length field of second CPB to indicate number of bytes of the third packet in the payload.

17. The method of claim 12, further comprising utilizing a timer to limit packet packing duration to a predefined time period before forwarding a partially packed cell to a queue.

18. The method of claim 17, further comprising utilizing a threshold checker to extend packet packing duration in response to network congestion.

19. The method of claim 18, further comprising forwarding cell packing cell ("CPC") contents to virtual output queue and clearing CPC when remaining payload of a packet is greater than available CPC payload.

20. The method of claim 19, further comprising forwarding CPC contents to virtual output queue when the CPC payload is full.

* * * * *